United States Patent [15] 3,682,187
Seymour et al. [45] Aug. 8, 1972

[54] PROCESS OF REDUCING FRICTION LOSS IN FLOWING HYDROCARBON LIQUIDS

[72] Inventors: Errol V. Seymour, Houston, Tex. 77024; Sol Davison, Richmond, Calif. 94806; Walter R. Haefele, Camino, Calif. 95709

[73] Assignee: Shell Oil Company, New York, N.Y.

[22] Filed: Nov. 9, 1970

[21] Appl. No.: 88,243

Related U.S. Application Data

[63] Continuation-in-part of Ser. No. 669,708, Sept. 22, 1967, abandoned.

[52] U.S. Cl. ............................... 137/13, 252/8.55 R
[51] Int. Cl. ................................................. F17c 1/14
[58] Field of Search......252/8.55 R; 137/13; 166/308; 260/879

[56] References Cited

UNITED STATES PATENTS 3,351,079  11/1967  Gibson................252/8.55 X
3,559,664  2/1971   Seymour..................252/8.55
3,215,154  11/1965  White et al. ..........252/8.55 X
3,416,899  12/1968  Schiff......................252/8.55

Primary Examiner—Herbert B. Guynn
Attorney—Martin S. Baer and William H. Myers

[57] ABSTRACT

A method of reducing friction during flow of hydrocarbon liquids through conduits by addition to the liquids of a small amount of certain hydrocarbon block copolymers.

This invention relates to a method of substantially decreasing friction in flowing hydrocarbon liquids through conduits, generally over great distances. More particularly, the invention is directed to the addition of a novel class of hydrocarbon copolymers to hydrocarbon liquids such as crude oil and fractions thereof so as to reduce substantially their friction due to flow through pipelines over great and short distances.

6 Claims, No Drawings

PROCESS OF REDUCING FRICTION LOSS IN FLOWING HYDROCARBON LIQUIDS

This application is a continuation-in-part of copending application Ser. No. 669,708, filed Sept. 22, 1967, now abandoned.

BACKGROUND OF THE INVENTION

It is well known in the art that friction under turbulent flow occurring in the transportation of hydrocarbon liquids ranging in viscosity from about that of gasoline to that of crude oil through pipelines contributes greatly to pumping costs due to increasing energy requirements necessary to overcome this phenomena as well as causing ultimate damage to the pipelines. Friction becomes apparent as a pressure drop in the pipeline as the hydrocarbon liquids are pumped through it.

To reduce friction and overcome the undesired effects mentioned above, various means have been tried such as coating of the pipe walls with friction reducing materials or by addition of friction reducing chemical agents to the transported liquid as described in U.S. Pat. Nos. 2,492,173; 3,023,760; 3,102,548; and 3,215,154. However, these means of reducing friction have met with little success because of the high cost of either coating the pipe walls or adding the friction reducing chemical agents in sufficient quantities for effectiveness are too high to be sufficiently compensated by savings from reduced friction.

It is an object of the present invention to reduce friction during the flow of hydrocarbon liquids in conduits.

Still another object of the present invention is to provide a novel class of additives for use in hydrocarbon liquids flowing through pipelines which would cause reduction in friction and a savings in pumping costs.

Still another object of the invention is to provide a process for pumping hydrocarbon liquids through pipelines wherein the pressure drop due to the liquid flow friction is greatly decreased.

Other objects will be apparent from the following description.

SUMMARY OF THE INVENTION

The above and other objects are attained according to this invention by addition of a small amount, preferably from 1 to 2,000 (usually 10–200) parts per million, of a block copolymer of two dissimilar alpha-olefinic hydrocarbons A and B and the hydrogenated derivatives thereof to hydrocarbon liquids being transported through a conduit.

The block copolymers with which the present invention is concerned have at least polymer blocks A and B which may be either in linear arrangement or in branched arrangement. For example, a typical basic polymer has the general configuration A—B—A. Thus the three general types contemplated especially in this invention have the configuration A—B—A, A—B—(B—A)$_n$ and A—(B—A)$_n$ wherein $n$ is an integer between 2 and about 5, although, if desired, the integer may be higher. The configuration A—B—(B—A)$_n$ represents the general configuration of branched copolymers wherein any essentially identical polymer blocks such as identical adjacent blocks B are considered to be a single polymer block insofar as molecular weight description is concerned. For example, a coupling reaction referred to hereinafter may be employed to synthesize an essentially cruciform polymer having the general configuration

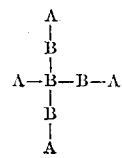

On the other hand, the linear type of block copolymer is represented by the general configuration A—(B—A)$_n$.

In this case, the synthesis is carried out in such a way that the block copolymer has an essentially linear configuration represented, for example, as follows:

A — B — A — B — A — B — A.

Block copolymers found to be especially useful for this purpose are those in which the polymer blocks A are formed from straight chain conjugated dienes having from four to eight carbon atoms, monoalkenyl aromatic hydrocarbons, ethylene or propylene as well as fully or partially hydrogenated derivatives of the first two types of polymer blocks. The polymer blocks B on the other hand are preferably selected from the group consisting of polymer blocks of conjugated dienes having from four to eight carbon atoms, hydrogenated derivatives thereof or copolymer blocks of ethylene with a higher alpha-olefins such as propylene or butylene. The block A should have an average molecular weight between about 4,000 and 500,000 (preferably 8,000–70,000 the block A content of the block copolymer being between about 10 and 70 percent by weight, preferably between 10 and 50 percent by weight of the entire block copolymer. The block B should have an average molecular weight between about 35,000 and 5,000,000, or even higher, usually between about 35,000 and 500,000. The average molecular weights given hereinbefore refer to analytical determinations made on deuterated samples of the block copolymers. Typical species of block copolymers falling within the scope of the polymers described above are as follows:

polybutadiene-polyisoprene-polybutadiene
polystyrene-polyisoprene-polystyrene
polystyrene-polybutadiene-polystyrene
poly(alpha-methyl styrene)-polybutadiene-poly(alpha-methyl styrene)
polyethylene-ethylene/propylene copolymer-polyethylene
polystyrene-hydrogenated polybutadiene (35% of 1,2)-polystyrene
poly(alpha-methyl styrene-hydrogenated polybutadiene (50% of 1,2)-poly(alpha methyl styrene)
poly(vinyl cyclohexane)-hydrogenated polyisoprene-poly(vinyl-cyclohexane)

polyisoprene-polystyrene-polyisoprene
polypropylene-ethylene/propylene copolymer-polypropylene The description of the individual blocks in the specification and claims is meant to refer not only to homopolymer blocks but random copolymer blocks as well, as long as any random copolymer blocks contain more than 50 percent by weight of the designated species or type. Suitable copolymer blocks include styrene/butadiene, butadiene/isoprene, styrene/alpha-methyl styrene, etc.

The preparation of the subject saturated block copolymers comprises the hydrogenation of block copolymers of particular conjugated dienes. The hydrogenation of such block copolymers converts them, in effect, to block copolymers having the structure of a block polymer of alpha-olefins.

The conjugated diene block copolymers are preferably prepared by one of two routes. These may be described as "sequential" on the one hand or as "-coupling" on the other. Each of these routes involves the same initial states: A conjugated diene hydrocarbon such as butadiene is subjected to solution polymerization in the presence of a lithium based catalyst, such as a lithium alkyl. Polymerization is conducted to the point where the first polymer block is formed, after which, without termination of the growing polymer chains, a branched chain conjugated diene is injected and polymerization is continued. In the sequential process, polymerization is conducted until the desired molecular weight of the entire second block is formed, after which a conjugated diene of the first type (e.g., butadiene) is injected in the system and the third polymer block is formed. If, however, the coupling process is involved, the polymerization of the branched chain conjugated diene block is conducted until the molecule is only about one-half of that desired, after which a coupling agent such as dihalohydrocarbon, divinyl arene, silicon tetra-chloride, a diester such as diethyl adipate, or carbon monoxide is injected in the system to couple the intermediate block copolymer. The products obtained by either process have the general configuration A—B—A, wherein each A is an essentially unbranched polymer block of a conjugated diene while B is a polymer block of a branched chain conjugated diene such as isoprene or 2,3-dimethyl butadiene. By "essentially unbranched" is meant a polymer block which does not contain regularly spaced or regularly oriented hydrocarbon substituents pendant from the backbone of the polymer chain.

The block polymers so obtained can be hydrogenated so that at least about 90 percent of the double bonds in the original block copolymer and preferably in excess of about 95 percent are hydrogenated. Thus, upon hydrogenation, the block copolymers having the structure polybutadiene-polyisoprene-polybutadiene become polyethylene-poly(ethylene-propylene)polyethylene.

The type of catalyst employed for the production of the alpha-olefin self-curing block copolymers is of importance in obtaining the optimum properties desired for such compositions. The usual Ziegler-type catalysts, such as titanium halides and the like may be employed for this purpose together with aluminum halides or aluminum organo halides. It is preferred to use 5–1,500 millimoles of titanium and 10–5,000 millimoles of aluminum per liter of total reaction mixture. Preferred catalysts comprise reaction products of an aluminum alkyl compound with a nickel or cobalt carboxylate or alkoxide.

The molecular ratio in which the catalyst components are present has a powerful influence upon both the rate and yield of the polymerization and on the properties of the polymer. In general, the number of atoms of vanadium and the number of aluminum atoms are in a ratio varying from about 0.05:1 and 2:1. In general, the highest yields and most desirable molecular weights are obtained when this ratio is between about 0.05:1 and 0.33:1. It is preferred to use 0.05–100 millimoles of vanadium and 0.5–50 millimoles of aluminum per liter of reaction mixture.

The block copolymerization is conducted in the presence of a hydrocarbon solvent which is essentially inert under the conditions of the polymerization. Alkanes and cycloalkanes such as hexane, cyclohexane, heptane or other saturated hydrocarbons having from four to ten carbon atoms per molecule are preferred solvents for this purpose. Aromatic solvents, benzene, toluene, etc., also can be used as well as some chlorinated alkanes and cycloalkanes. These solvents may be modified by the additional presence of 0.5–10 percent by weight of a chlorocarbon such as carbon tetrachloride.

The polymerization is to be conducted under conditions which will avoid inadvertent termination of the growing polymer chain. This temperature range is usually between about −25°C, and 125°C, the preferred range being between about −15° and 75°C.

The following examples illustrate the direct route for preparation of the subject block copolymers from alpha-olefins as well as the indirect route, by which is meant the preparation of the diolefin block copolymer followed by its hydrogenation.

EXAMPLE I

Sequential Process for Conjugated Diene Block Polymer Preparation

A block copolymer was prepared from butadiene and isoprene in cyclohexane as solvent at 50° to 55°C, utilizing butyl lithium as the catalyst. The initial polymer block was formed by polymerizing butadiene in the solvent in the presence of the catalyst to form a block having an average molecular weight of about 40,000. Without further treatment of the polymer so formed, isoprene was added and polymerization continued at about 50°C to form the intermediate block copolymer having the configuration polybutadiene-polyisophrene-Li. Without further treatment of the intermediate, butadiene was introduced and polymerization continued until the three-block copolymer having the structure polybutadiene-polyisoprene-polybutadiene was formed, the average molecular weights of the individual block being 40,000–200,000–40,000.

EXAMPLE II

Coupling Process for Conjugated Diene Block Polymer Preparation

Butadiene was polymerized in cyclohexane solvent at 50°–55°C utilizing butyl lithium catalyst to form the initial polybutadiene block, after which isoprene was introduced and polymerization continued to form the intermediate block copolymer polybutadiene-½-polyisoprene-Li, wherein "½-polyisoprene" is meant a polyisoprene block having only about one-half of the molecular weight desired in the coupled final product. Dibromoethane was then introduced into the reaction mixture and coupling immediately took place to form a coupled product having essentially the same structure as the three-block copolymer formed in accordance with Example I.

EXAMPLE III

Hydrogenation of Conjugated Diene Block Copolymers

Hydrogenation of the polymer prepared by the process according to Example I was effected in the presence of a catalyst prepared by contacting nickel acetate with aluminum triethyl, in a molar ratio of 1.5/1 aluminum/nickel. The catalyst components were heated in cyclohexane for 30 minutes at 130°C. An amount of catalyst sufficient to provide 1 percent by weight of reduced nickel based on the polymer was suspended in a cyclohexane solution of the polymer, the solution containing 14 percent by weight of the latter. The reactor was pressured to 1,500 psig with hydrogen and heated to a maximum of 140°C with vigorous stirring. The total reaction time was 140 minutes (120 minutes above 130°C). Absorption of hydrogen took place immediately and was probably completed within 30 minutes. The final reaction pressure at 140°C was 1,120 psig. The product was essentially completely hydrogenated and had the configuration of a polymer of polyethylene-poly-(ethylene-propy-lene)-polyethylene. The hydrogenated polymer was soluble in hot benzene.

EXAMPLE IV

Direct Synthesis of Alpha-Olefin Block Copolymers

A three-block copolymer polypropylene-EPR-polypropylene, was prepared using a gamma-TiCl$_3$-Al(C$_2$H$_5$)$_2$Cl catalyst. The initial reaction conditions were 21.6 millimoles Ti per liter, 64.9 millimoles Al per liter, 26°C and 500 cc n-heptane solvent. At a reactor pressure of 5 psig, a small amount of propylene was added to the reactor to initiate the active catalyst sites. After 15 minutes, reactor pressure was increased to 20 psig and propylene was added at 0.284 moles per minute for 2.5 minutes. One liter of n-heptane saturated with ethylene at 30 psig and 20°C was added to the reaction mixture and, in addition, ethylene and propylene were bubbled through the reaction mixture at 0.0804 and 0.284 moles per minute, respectively, for 7.5 minutes. The reactor pressure was 25 psig during these operations. The ethylene then was omitted and the propylene rate increased many fold. Propylene was added for 5 minutes, after which the product was dumped into acetone to stop reaction.

Samples taken after the formation of each block showed cumulative intrinsic viscosities (150°C, decalin) of 2.7, 3.5 and 4.3 dl/g, respectively.

Block copolymers can also be prepared using a vanadyl diisopropyl silicylate-aluminum ethyl dichloride catalyst. In this case, polyethylene-poly-(ethylene-propylene)-polyethylene copolymers can be formed using a procedure similar to the one cited above. However, in order to minimize chain transfer and premature deactivation of the catalyst, it is necessary to use an alkyl which is a less powerful reducing agent and also lower temperatures. Accordingly, 0°C, 0.25 millimoles V/liter, 2.5 millimoles Al/liter, 3 psig and n-heptane as solvent were the polymerization conditions employed.

Still other block copolymers having the general configuration A—B—A as defined above can be used, but in which A is a polymer block of a vinyl arene or an alkenyl substituted aromatic hydrocarbon as described in U.S. Pat. Nos. 3,239,478 and 3,322,856 and include block copolymers of poly-styrene-polyisoprene-polystyrene, block copolymer of polystyrene-polybutadiene-polystyrene and their hydrogenated derivatives.

The block copolymers of this invention which are useful as friction and drag reducing agents for transportation of hydrocarbon liquids in conduits contain in the molecule both oil-soluble and oil-insoluble groups or units and, in general, the total average molecular weight of said block copolymer can vary from about 30,000 to more than 1,000,000. These block copolymers when used as friction reducers in hydrocarbon liquids flowing through pipelines are effective in causing a 20–40 percent pressure reduction at concentrations of from 10 to 2,000 ppm, preferably between 50 and 1,000 ppm. The degradation rate of these block copolymers is negligible in straight pipeline flow where shear stresses are small, making it effective for long intervals.

Some examples of block copolymers prepared as described above are as follows:

1. Block copolymer of polystyrene-polyisoprene-polystyrene    MW=110,000–120,000
2. Hydrogenated derivative of (1)    MW = 120,000–140,000
3. Vinyl cyclohexane-ethylene/propylene rubber - vinyl cyclohexane block copolymer    MW = 110,000
4. Block copolymer of polybutadiene-polyisoprene-polybutadiene    MW=140,000–900,000
5. Hydrogenated derivative of (4)    MW = 140,000–900,000
6. Block copolymer of polystyrene-polybutadiene-polystyrene    MW=70,000–100,000
7. Hydrogenated derivative of (6)    MW = 70,000–100,000

To illustrate the effectiveness of the block copolymers of the present invention in reducing friction in hydrocarbon liquids flowing through a pipeline, liquids as shown in Table 1 were circulated through a pipeline system and fluid pressure differential was measured across a test section of the pipeline. The pressure drop across the test section when pumping different hydrocarbon liquids alone was compared with the pressure drop when pumping crude oil containing the dissolved block copolymer(s) noted above. The flow rate, and any increase in flow rate, was determined also.

The percentage friction reducing was defined as $$100(1 - \Delta p^{(p)}/\Delta p)$$

where $\Delta p$ was the pressure drop over the 4-foot long test section with only a hydrocarbon liquid flowing round the loop and $\Delta p^{(p)}$ was the pressure drop over the same length of pipe with polymer in the system. Both pressure drops were referred to a constant flow rate.

A list of some of the tests made is given below in Table 1. Block copolymer (5) was dissolved in the solvent shown, placed in a container and pumped around the pipeline loop. Rancho Sweet crude oil with a viscosity of 39.0 SSU at 80°F was employed as well as toluene, n-hexane and kerosene and the results are shown below.

TABLE 1

| Hydrocarbon Liquid | Polymer Concentration in Pipeline (ppm) | Maximum Friction Reduction at Constant Flow Rate (%) | Pressure Drop Over 4-Foot Test Length (psi) | |
|---|---|---|---|---|
| | | | Before Adding Polymer | After Adding Polymer |
| Toluene | 500 | 22 | 1.84 | 1.48 |
| Toluene | 500 | 25 | 1.75 | 1.33 |
| Toluene | 500 | 14 | 1.86 | 1.62 |
| Benzene | 1,000 | 23 | 1.64 | 1.30 |
| Toluene n-Hexane and | 300 | 32 | 2.02 | 1.43 |
| Toluene | 300 | 22 | 1.67 | 1.34 |
| Kerosene | 300 | 37 | 7.07 | 4.75 |
| Kerosene | 300 | 27 | 2.5 | 1.9 |
| Kerosene | 600 | 33 | 2.35 | 1.65 |

The foregoing description of the invention is merely intended to be explanatory thereof. Various changes in the details of the described method may be made, within the scope of the appended claims, without departing from the spirit of the invention.

For example, the invention applied to the pipeline transportation of oil suspension or slurries wherein the suspended material is being transported such as to a processing or a shipping site. Materials particularly contemplated in this situation include sulfur, coal, iron ore or other metallic ores as well as mineral asphaltites such as Gilsonite.

We claim as our invention:

1. A method of reducing friction in a pipeline transporting a liquid hydrocarbon comprising injecting into or adding to a liquid hydrocarbon from about 1 to 2,000 ppm of a block copolymer having at least three polymer blocks A and B, blocks A being selected from the group consisting of (1) polymer blocks of straight chain conjugated dienes having from four to eight carbon atoms, (2) styrene, (3) alpha methyl styrene, (4) ethylene, (5) propylene, and (6) hydrogenated derivatives of types (1) and (2); blocks B being selected from the group consisting of polymer blocks of (7) conjugated dienes having four to eight carbon atoms, (8) hydrogenated derivatives of (7), wherein each block A has an average molecular weight between about 4,000 and 500,000, the block A content comprising 10–70 percent of the copolymer, and each block B has an average molecular weight between 35,000 and 5,000,000.

2. A method according to claim 1 wherein the liquid hydrocarbon is a crude oil or fraction thereof.

3. A method according to claim 1 wherein the block copolymer has an average molecular weight between about 500,000 and 5,000,000.

4. A method of reducing friction in a pipeline transporting a liquid hydrocarbon comprising injecting into or adding to a liquid hydrocarbon from about 10 to about 200 ppm of a block copolymer having the general configuration:

$$A-B-A$$

and selected from the group consisting of:

1. copolymers wherein A is a straight chain conjugated diene of from four to eight carbon atoms and B is a branched chain conjugated diene selected from the group consisting of isoprene and 2,3 dimethyl butadiene;
2. copolymers wherein A is styrene and B is butadiene;
3. hydrogenated derivatives of said copolymers (1) and (2); and
4. copolymers wherein A is ethylene, propylene, or vinyl cyclohexane and B is a copolymeric block of ethylene and propylene; wherein the A block of each copolymer has an average molecular weight between about 8,000 and 70,000 and the B block of each copolymer has an average molecular weight between about 35,000 and about 500,000, and the A blocks comprise between about 10 percent and 50 percent of the block copolymer.

5. A method of reducing friction in a pipeline transporting a liquid hydrocarbon comprising injecting into or adding to a liquid hydrocarbon from about 1 to 2,000 ppm of polybutadiene-polyisoprene-polybutadiene block copolymer wherein each block polybutadiene has an average molecular weight between about 4,000 and 500,000, the block polybutadiene content comprising 10–70 percent of the copolymer, and each block polyisoprene has an average molecular weight between 35,000 and 5,000,000.

6. A method of reducing friction in a pipeline transporting a liquid hydrocarbon comprising injecting into or adding to a liquid hydrocarbon from about 1 to 2,000 ppm of hydrogenated derivative of polybutadiene-polyisoprene-polybutadiene block copolymer wherein each block polybutadiene has an average molecular weight between about 4,000 and 500,000, the block polybutadiene content comprising 10–70 percent of the copolymer, and each block polyisoprene has an average molecular weight between 35,000 and 5,000,000.

* * * * *